United States Patent [19]

Jin

[11] Patent Number: 5,328,125
[45] Date of Patent: Jul. 12, 1994

[54] VCR DECK TAPE LOADING MECHANISM

[75] Inventor: Hong J. Jin, Seoul, Rep. of Korea

[73] Assignee: Goldstar Co., Ltd., Seoul, Rep. of Korea

[21] Appl. No.: 996,413

[22] Filed: Dec. 23, 1992

[30] Foreign Application Priority Data

Dec. 24, 1991 [KR] Rep. of Korea ............... 1991-24278

[51] Int. Cl.[5] ............................................. G11B 23/04
[52] U.S. Cl. ................................................... 242/335
[58] Field of Search ....................... 242/198, 206, 209; 360/85, 95, 96.1, 96.2, 96.4; 226/181

[56] References Cited

U.S. PATENT DOCUMENTS

| | | | |
|---|---|---|---|
| 4,554,605 | 11/1985 | Saito et al. | 360/96.1 |
| 4,566,047 | 1/1986 | Hirose et al. | 360/85 |
| 4,797,758 | 1/1989 | Yamaguchi et al. | 360/95 X |
| 4,837,645 | 6/1989 | Miyamoto et al. | 360/85 |
| 4,872,075 | 10/1989 | Yamaguchi et al. | 360/95 X |
| 4,964,002 | 10/1990 | Nakamichi | 360/95 |

FOREIGN PATENT DOCUMENTS

| | | | |
|---|---|---|---|
| 0087952 | 9/1983 | European Pat. Off. | 360/85 |
| 2094541 | 9/1982 | United Kingdom | 242/199 |

Primary Examiner—Daniel P. Stodola
Assistant Examiner—John P. Darling
Attorney, Agent, or Firm—Morgan & Finnegan

[57] ABSTRACT

A VCR (Video Cassette Tape Recorder) deck tape loading mechanism comprising a first cam gear driven by a loading motor, and a second cam gear, and a loading gear, moving in response to the movement of the first cam gear. The first cam gear drives a pinch lever to a loading position and the second cam gear drives a take up arm so as to make it possible for the take up arm to guide the pinch lever. The loading gear drives a slant base to move along a rail on a base so that the tape is able to take the most optimum path because each moving part can move smoothly in sequence without interference from one another due to the independent movement of the pinch lever and the take up lever. A thinner model of the mechanism is made available by placing first cam gear and second cam gear on the bottom of main base and cam lever and take up lever above them.

18 Claims, 8 Drawing Sheets

VCR DECK TAPE LOADING MECHANISM

BACKGROUND OF THE INVENTION

This invention is related to a tape loading mechanism for a VCR(Video Cassette Tape Recorder)deck, particularly for a deck having two cams which drive a pinch roller and take up roller independently thereby resulting in moving each driving parts in sequence and allowing the tape to take the most optimum path and making the construction thinner.

Figure 1:
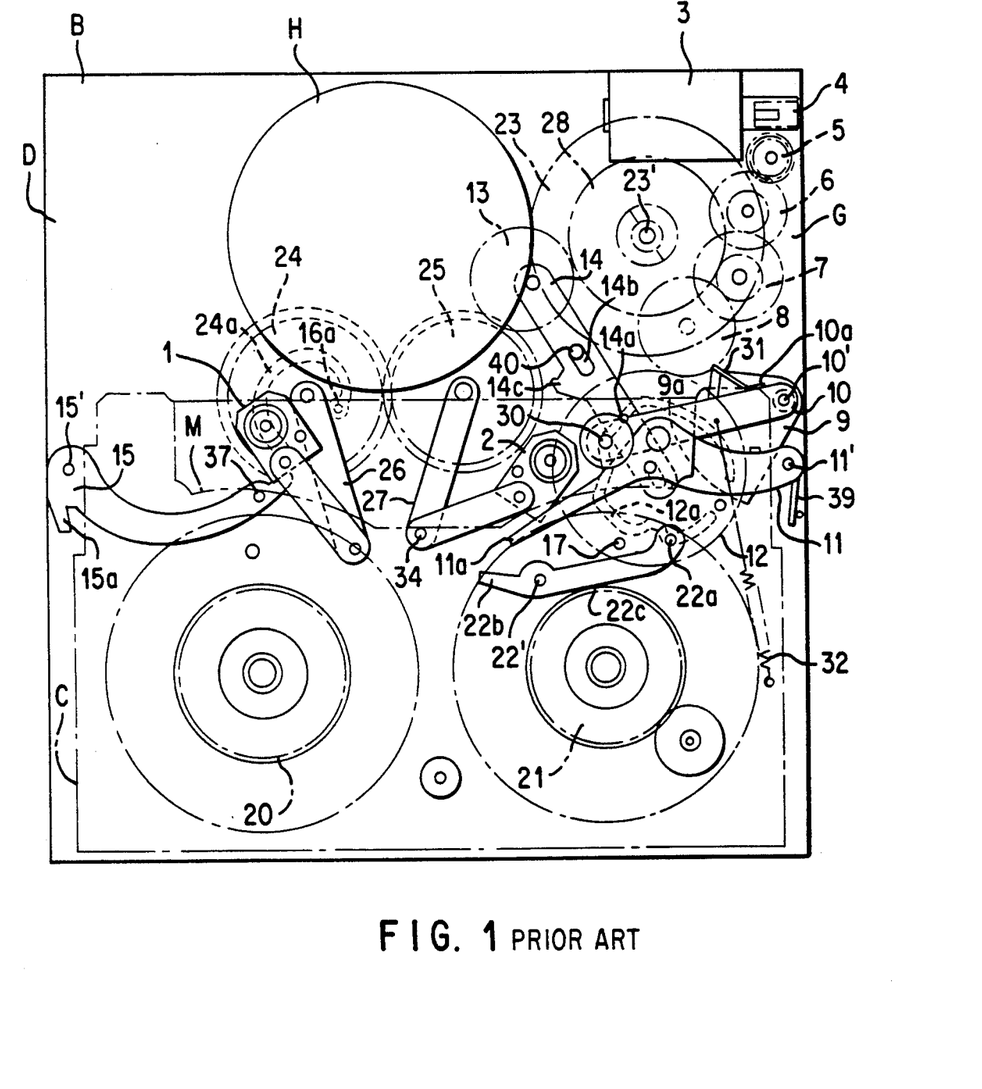
FIG. 1 shows the construction of a conventional (prior art) VCR deck tape loading mechanism.

As shown in FIG. 1, in the prior art VCR deck tape loading mechanism design, head drum(H) is placed inclined in the central part of the rear section of main base 1 and a cassette c is mounted in forward section of the main base 1 in which are contained respectively supply reel 20 on the left and take up reel 21 on the right.

Loading gears 24,25 meshing each other are provided under the head drum(H).

Loading levers 26,27 each having two levers and positioned above the loading gear 24,25 are connected to the loading gears 24,25 respectively, and, in turn, the loading levers 26,27 are connected to slant bases 1,2 respectively, thereby each slant base moves from inside of the mouth M of tape cassette to the position of loading completion in response to the rotation of the loading gears 24,25, and moves further until it comes to compress against V-stopper(not shown) upon further rotation of the loading gears.

There are provided on the main deck D, a loading motor 3 at the right corner of the rear section, a cam gear 12 in front of the loading motor, a capstan motor 23 between them, and a gear train G i.e., gears a 5, b 6, c 7 and d 8 which transmit power via a worm 4 from the loading motor 3 to the cam gear 12 on one side of the capstan motor 23.

Between the capstan motor 23 driving gear 28 and the loading gear 25, there is provided a relay lever 14 which is adapted to move in straight line in order to connect or disconnect power selectively, a pin 14a fixed at one end of the relay lever 14 and moving inside of a cam groove 12a of the cam gear 12 in response to the rotation of the cam gear 12 enabling the straight line movement and a relay gear 13 on the rear end of the relay lever 14 to connect or disconnect above capstan motor 23 driving gear 28 to the loading gear 25.

A reel ratchet 22 is movably connected by a shaft 22' and a pin 22a in one end of the ratchet is inserted in a cam groove 12a of the cam gear, so that the reel ratchet moves in response to the rotation of the cam gear 12.

A pinch arm 10 having a pinch roller 30 and a pinch lever 9 are connected by the same shaft 10' on one side of the cam gear 12, a torsion spring is placed on the shaft 10' while both ends of which are latched on a latching tips 9a, 10a of pinch lever 9 and pinch arm 10 respectively so as to keep pushing both parts close together, one side of the pinch lever 9 contacts with the cam pin 17 fixed on the upper surface of the cam gear 12, and the pinch arm 10 is connected with a tension spring 32 tending to rotate the pinch arm 10 in counter clockwise direction.

On one side of the pinch arm 10, a take up arm 11 having a guide roller 33 in the middle, is connected to a shaft 11', the shaft 11' is provided with a torsion spring 31 tending to rotate the take up arm 11 in clockwise direction, and a driving pin 34 projected upward and positioned in the middle of the loading lever 27 drives the rear 11a of the take up arm 11 forward when the slant base 2 is in loading condition.

Figure 2A:
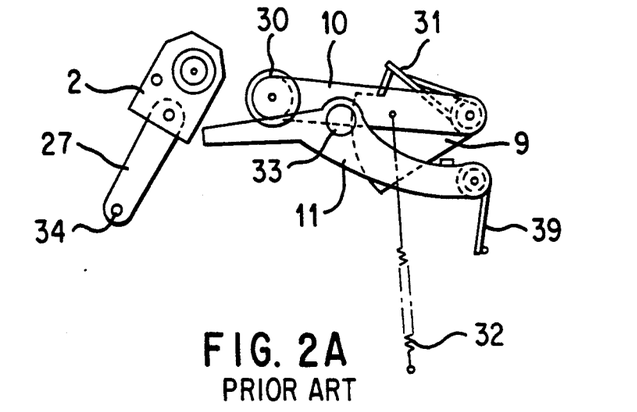

In such a conventional mechanism, as shown in FIG. 2A, the pinch roller 30 and guide roller 33 are positioned in tape mouth M by the tension spring 32 biased on pinch arm 10 in unloaded condition.

Figure 2B:
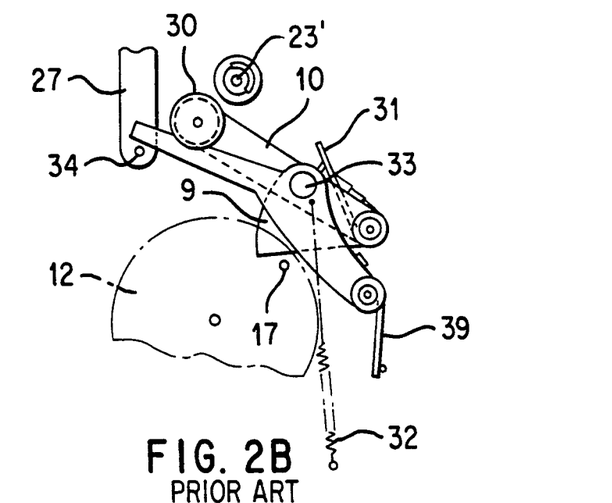

On starting of loading in this condition, the driving motor 3 drives loading gear 24 and cam gear 12 through gear train G, as shown in FIG. 2B, the slant base 2 moves along the guide rail of main base 1 in response to the rotation of loading gear 25 and the driving pin 34 connected with slant base 2 through loading lever 27 rotates take up arm 11. Then the shaft 30' of pinch roller 30 in contact with take up arm 11 rotates pinch arm 10 so that the pinch roller 30 approaches to capstan shaft 23'. Also the cam gear 12 rotates making the cam pin 17 approach pinch lever 9.

Figure 2C:
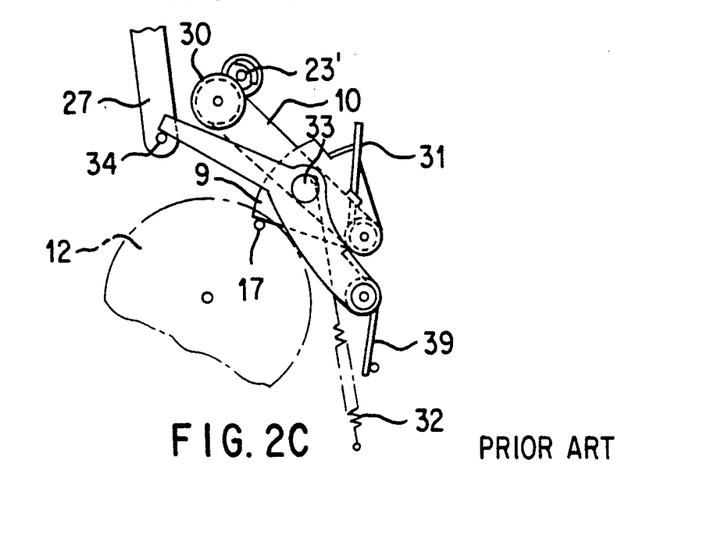

In this condition, upon further rotation of cam gear 12, cam pin 17 further pushes pinch lever 9 so as to rotate pinch arm 10 biased by torsion spring 31 further, making the pinch roller 30 to contact closer with the capstan shaft 23' as shown is FIG. 2C.

As seen above, in the conventional mechanism, the driving guide parts are driven by one cam gear and can not be driven independently from each other. The achievement of the optimization of the tape path is difficult because the driving guide parts can not be driven on desired timing during loading.

SUMMARY OF THE INVENTION

The object of the present invention is to provide a VCR deck tape loading mechanism in which levers driving the pinch roller and take up roller are driven independently from each other by means of two cams in order to drive each driving part without interference from each other, and thereby achieving optimization of tape path.

Another object of the present invention is to provide a thinner VCR deck tape loading mechanism by arranging 2 cams underneath, and cam lever, take up lever, pinch arm and take up arm above them.

In order to achieve above objects, the VCR deck tape loading mechanism of the present invention is characterised in that a pinch lever driving part driven by a loading motor, moves pinch lever to loading position, a take up arm driving part moving in response to the movement of the pinch lever driving part, moves take up arm in order to guide pinch lever, and a slant base driving part moving in response to the movement of take up arm driving part, moves the slant base along a rail placed on the base.

BRIEF DESCRIPTION OF THE DRAWING

FIG. 2 Shows a conventional (prior art) VCR deck tape loading mechanism in operation as follows;
 (A) Unloading in progress
 (B) Loading in progress
 (C) Loading completed FIG. 3 Shows the construction of a VCR deck tape loading mechanism according to the present invention, in operation as follows;
 (A) Unloading in progress
 (B) The take up arm is being engaged by the slant base at the beginning of loading (C) The take up arm is being disengaged from the slant base
(D) Loading completed.
(E) The pinch roller is in close contact with capstan shaft.

DETAILED DESCRIPTION OF THE INVENTION

There is shown a VCR deck tape loading mechanism of the present invention in FIG. 3.

A pinch lever driving part driven by a loading motor(not shown) drive pinch lever 120 to loading position, a take up arm driving part moving in response to the movement of the pinch lever driving part, drive take up arm 107 so that the take up arm can guide pinch lever 120 and a slant base driving part moving in response to the movement of the take up arm driving part, drive the slant base 106 along a rail 110a placed on a base 110.

Above pinch lever driving part comprises first cam gear 101 having first cam groove 101b formed along the direction of rotation on one side and driven by the loading motor, a pinch lever 120 rotatably connected on base by third hinge pin 118 and moving toward capstan shaft 121 by the movement of above cam lever 116 along a long hole formed in one side of the pinch lever, the cam lever 116 having a cam pin 116a in the middle and inserted in first cam groove of first cam gear 101, one end rotatably connected to a base 110 by second hinge pin 117 and the other end movably connected to the long hole 120a of pinch lever 120 by a pin 116b so as to move toward the center of rotation of first cam gear 101 by the movement of first cam groove 101b moving in accordance with the rotation of first cam gear, a pinch arm 108 rotatably connected to the base 110 by a hinge pin 118 on one end and rotating in the same direction with the pinch lever 120, and a pinch roller 108a positioned in one end of pinch arm 108 and rotating with capstan shaft.

A torsion spring 119 is placed on third hinge pin 118 and both ends, held by pinch lever 120 and pinch arm 108, push pinch lever 120 and pinch arm 108 closer together.

The take up arm driving part comprises second cam gear 102 having second cam groove 102a formed along the direction of rotation on one side and driven by first cam gear 101, a take up lever having a cam pin 113a inserted in second cam groove 102a of second cam gear 102 and a latching pin 113c locking/unlocking the rotation of take up arm 107, one end rotatably connected on base 110 by first hinge pin 114 and the other end provided with a spring pin 113b to accommodate a tension spring 115 connecting take up arm 107 so as to move toward the center of rotation of the second cam gear 102 by the movement of second cam groove 102a moving in accordance with the rotation of second cam gear, and a take up arm 107 having one end rotatably connected to a fixed shaft 101a of first cam gear 101, having the other end provided with a take up roller 107a and a contact tip 107d to contact with latching tip 106a of slant base 106, and having a latching slot 107b in the middle to lock/unlock latching pin 113c of the take up lever 113 so as to move below the pinch lever 120 by the movement of the take up lever 113.

The slant base driving part comprises a loading gear 103 moving in response to the cam gear 102, a rotating bracket 109 rotatably connected to center shaft 103a of the loading gear 103 and rotating in the same direction with loading gear 103, first link 111 rotatably connected on the rotating bracket 109 and rotated by the rotating bracket 109, second link 112 rotatably connected to first link, and a slant base 106 moving along a rail 110a fixed on the base 110, by the rotation of the second link 112 connected to the slant base 106 and having a latching tip 106a to guide and prevent the take up arm 107 to stray from the path during the take up arm 107 rotates.

Figure 4:
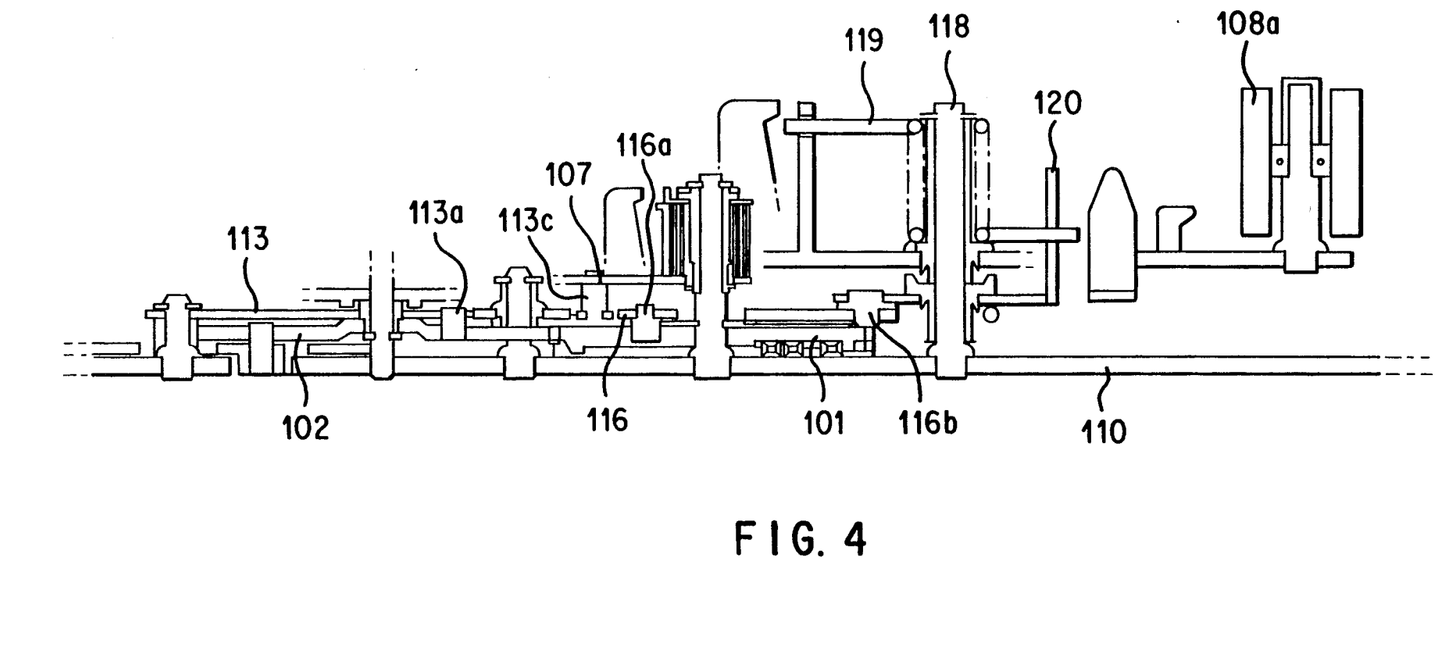
FIG. 4 Shows an elevation of a VCR deck tape loading mechanism in accordance with the present invention.

In addition, as shown in FIG. 4, first cam gear 101 and second cam gear are arranged on the bottom of maim base 110 and the take up lever 113 and cam lever 116 are arranged in the same plane above the two gears 101, 102.

Figure 3A:
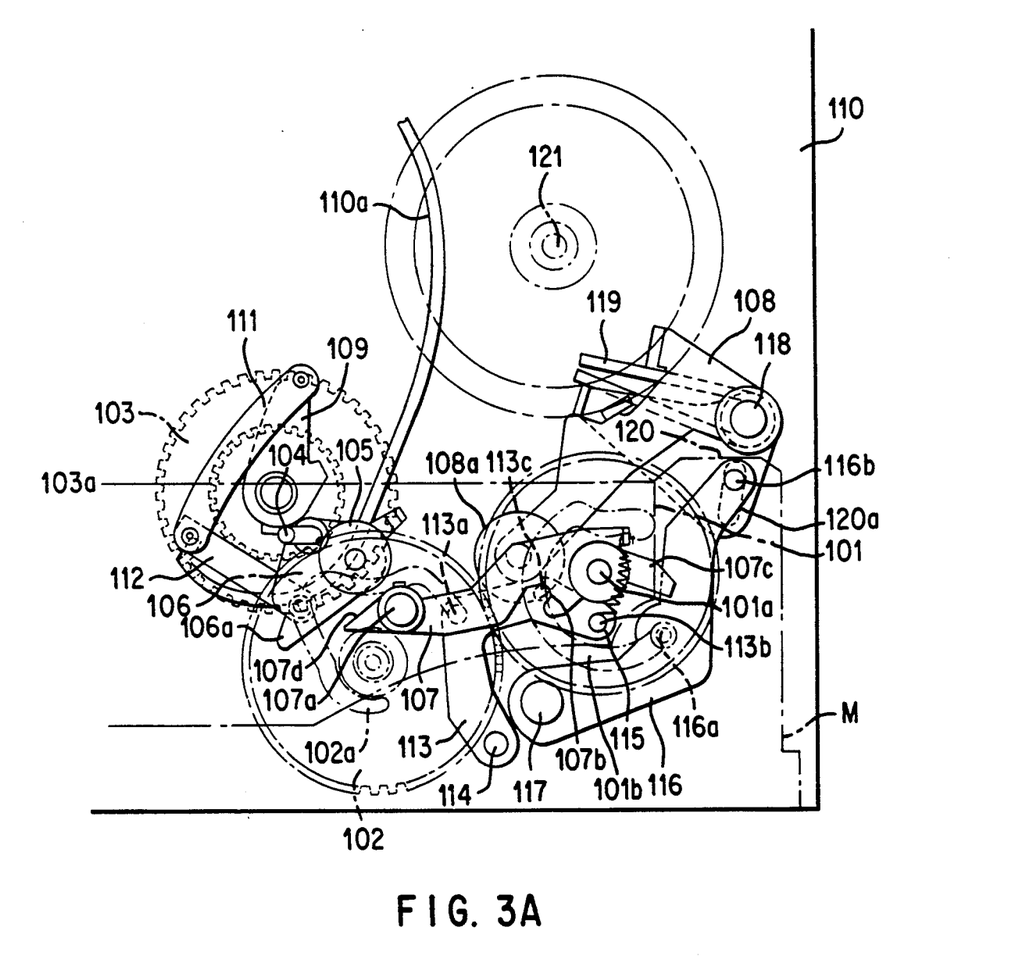

In the present invention having the above described mechanism, when a cassette is mounted in the mechanism in unloaded condition, guide roller 105, pinch roller 108a and take up roller 107a are positioned inside of cassette mouth M and the take up arm 107, pinch lever 120 and pinch arm 108 are positioned in fully rotated condition in counter clockwise direction as shown in FIG. 3A.

The take up arm 107 tending to rotate in clockwise direction by a tension spring 115 biased between the aft end and a spring pin 113b and placed in one end of the take up lever 113, is restrained above movement by a latching pin 113c on the take up lever 113 latched in latching slot 107b.

Figure 3B:
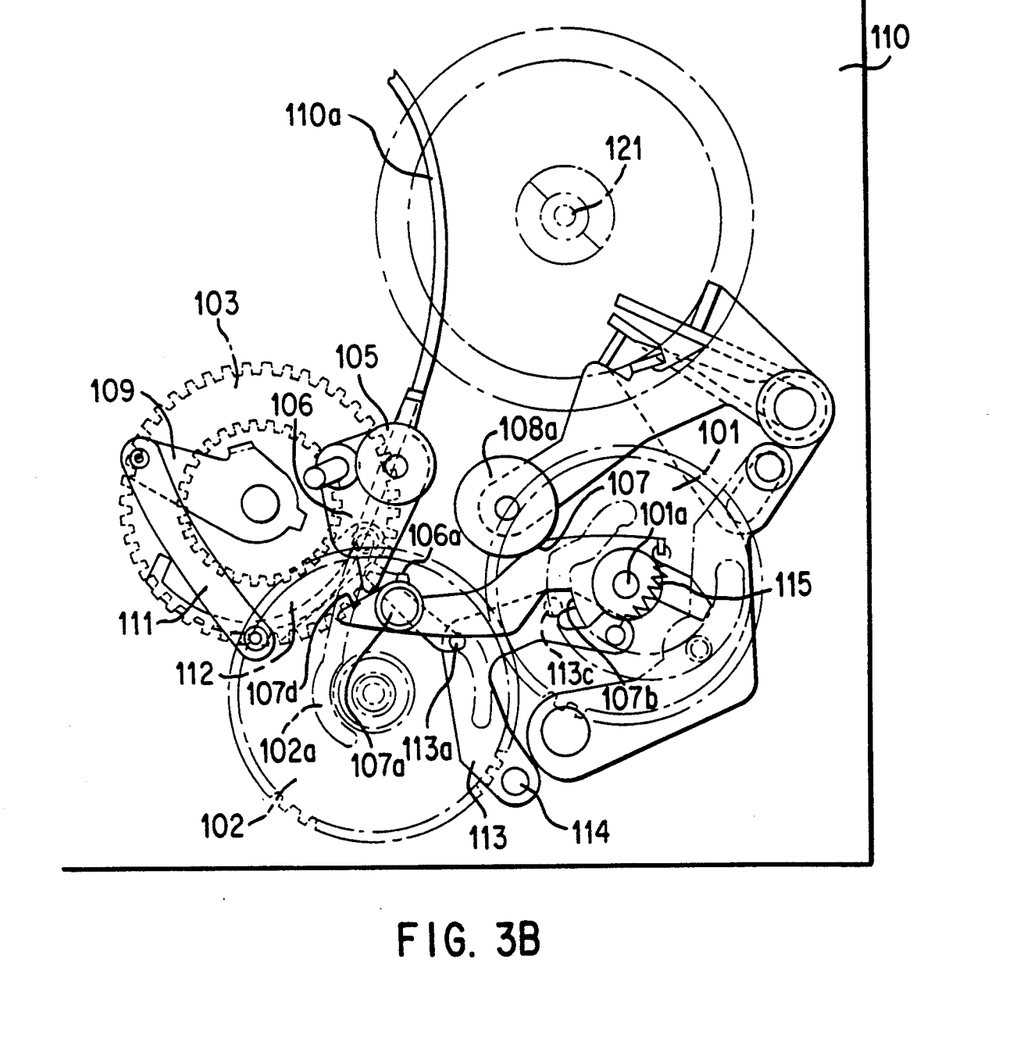

In the above condition, if a cassette is mounted and the power of the loading motor 3 is transmitted to first cam gear 101, first cam gear 101 rotating in counter clockwise direction causes second cam gear 102 and the loading gear 103 to rotate in clockwise direction and counter clockwise direction respectively, which, in turn, as shown in FIG. 3B, causes to move the slant base 106 provided to move in response to the movement of the loading gear 103, through rotating bracket 109 and links 111 and 112, moves along the guide rail 110a provided on main chassis 110, and causes to rotate, at the same time, the take up lever 113 in counter clockwise direction centered on first hinge shaft 114 by the cam pin 113a of the take up lever 113 which moves along the cam groove 102a of second cam gear 102. In this moment, the latching pin 113c of the take up lever 113 is disengaged freeing the take up arm 107, from the latching slot 107b of the take up arm 107, so that the take up arm 107 rotates in a clockwise direction centered on first cam gear 101 shaft 101a by the elastic force of spring 115, but the one end 107d only to be caught by the latching tip 106a of the slant base again.

To enable the above mentioned movements, the movements should be carried out with a time lag in close relationship to one another because the above movements is only possible when there are no overlap among the movements of the guide roller 105 of the slant base 106, the pinch roller 108a of the pinch arm, and the take up roller 107a of the take up arm 107, which guide or pull the tape at the same time by direct contact with the tape.

Figure 3C:
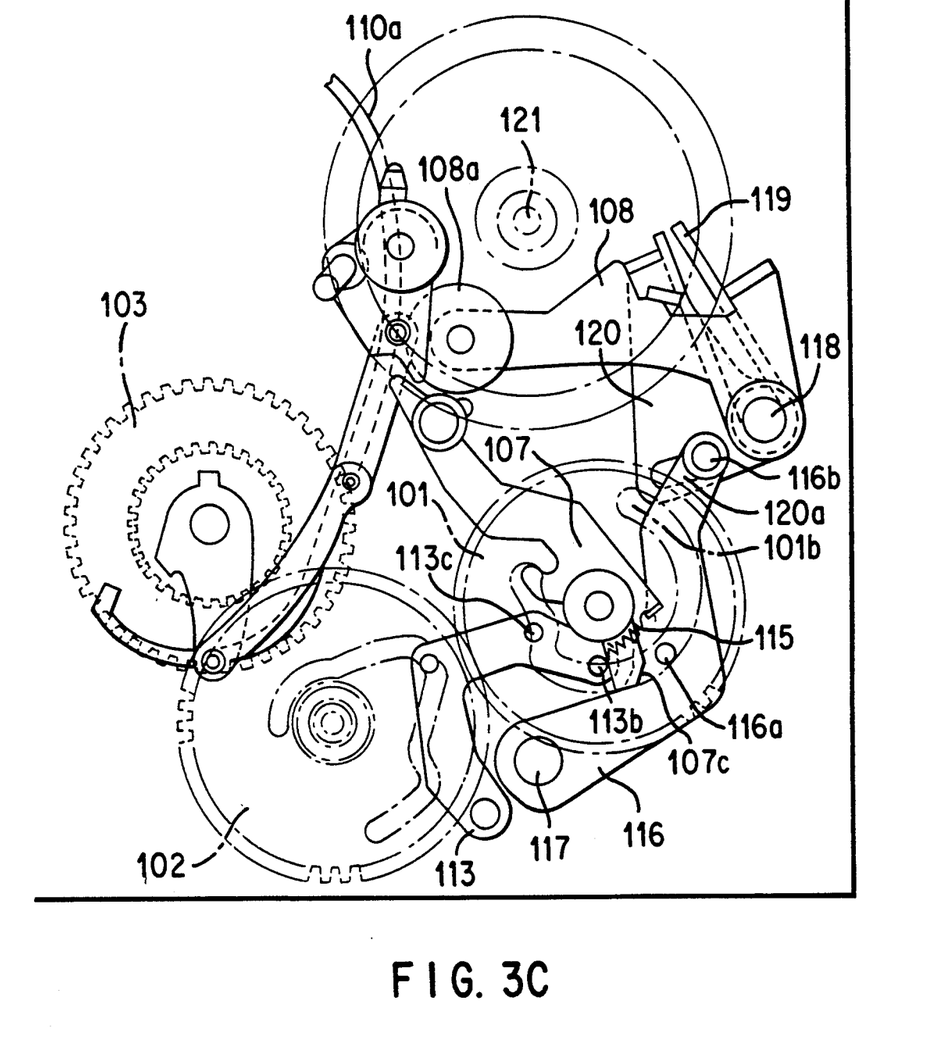

Upon further progress of loading, the slant base 106 continues to move along the guide rail 110a. And the rotation of second cam gear 102 causes the take up lever 113 having the cam pin 113a guided by the cam groove 102a to rotate in counter clockwise direction, which in turn causes the latching pin 113c to be disengaged from the latching slot 107b of the take up arm 107. The take up arm 107 freed from the latching pin 113c of the take up lever 113 in above mentioned movements rotates in clockwise direction for a moment, but the one end 107d only to be caught by the latching tip 106a of the slant base 106 as shown in FIG. 3B, and upon further continuation of movement, a supporting tip 107c formed, in rear end of the take up arm 107, is held by the spring pin 113b provided in one end of the take up lever 113 as shown in FIG. 3C. And the cam lever 116 having the cam pin 116a moving along first cam groove 101b of first cam gear 101, rotates counter clockwise direction centered on second hinge shaft 117, the pinch lever 120 rotates clockwise direction in response to the movement of pin 116b of cam lever 116 inside of the long hole 120a of pinch lever 120, also the pinch arm supported on the pinch lever 120 through biased torsion spring 119, rotates clockwise direction centered on No. 3 hinge shaft 119 and the pinch roller 108a on pinch arm 108 approaches to capstan shaft 121.

The reason for the take up arm 107 to be moved by means of the elastic force of spring in 3 steps of restraint of latching pin 113 of take up lever, latching tip 106a of slant base 106 and spring pin 113b of take up lever 113 is to distribute the force moving take up arm, through the beginning, the middle, and the end of loading, because the total rotating angle of take up arm 107 is more than twice compared with the total rotating angle of pinch arm 108.

Figure 3D:
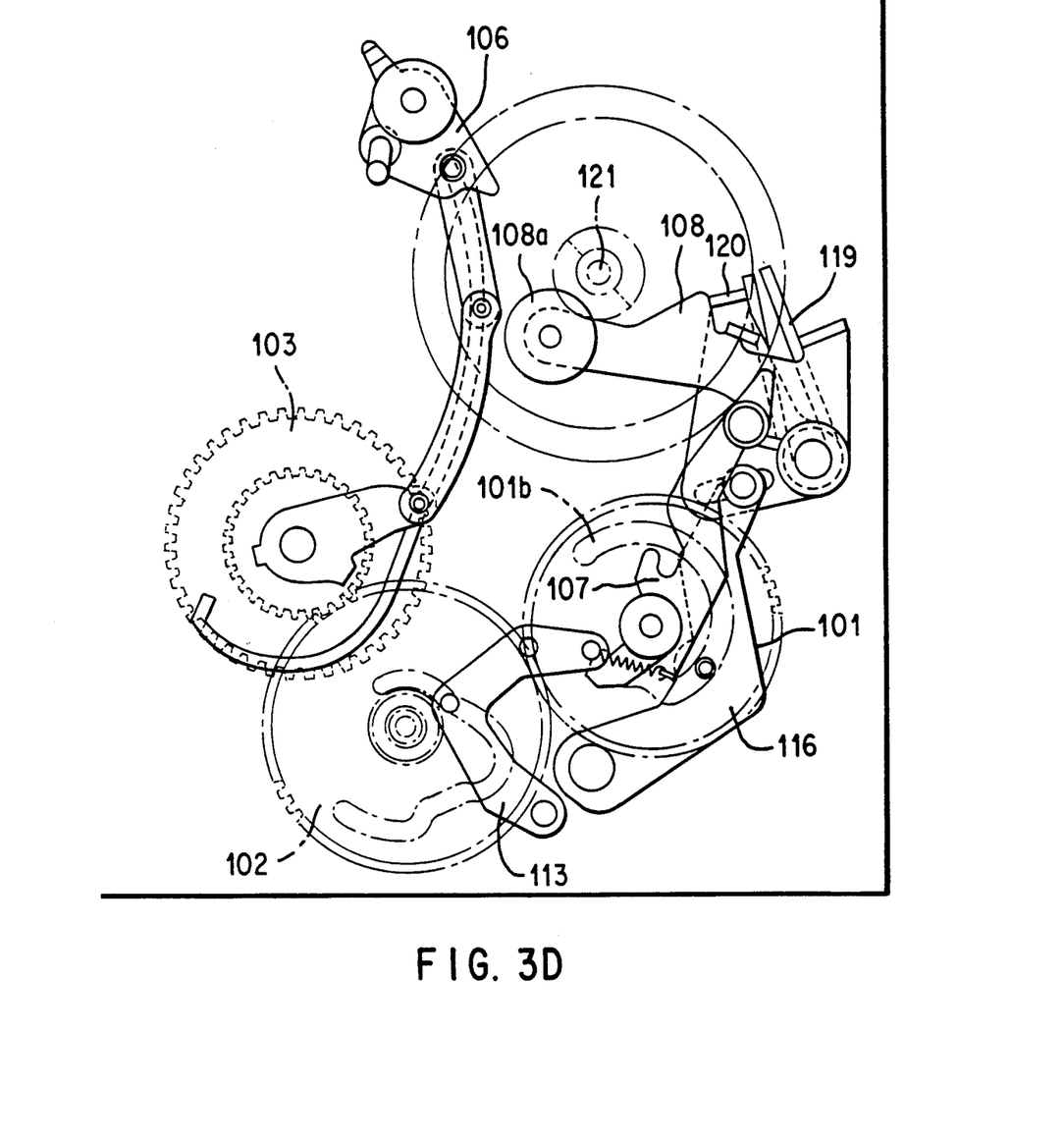
Figure 3E:
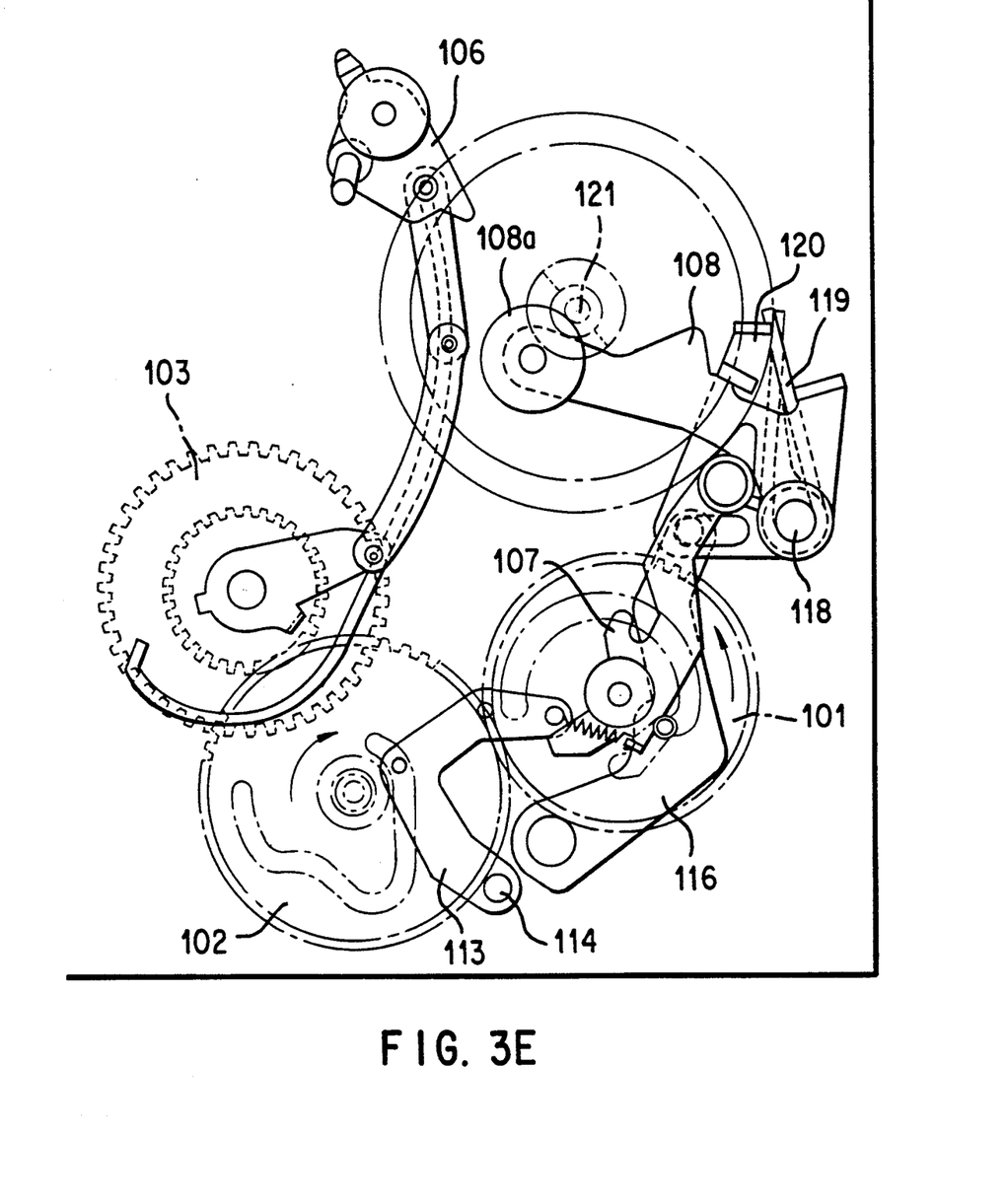

Upon further continuation of rotation of the loading motor in above mentioned condition, the slant base 106 continues to move further along guide rail 110a, take up arm 107 finishes rotation, and pinch arm 108 is about to contact capstan shaft 121 as shown in FIG. 3D. At this moment, if the cam lever guided by the cam groove 101b of first cam gear 101, further pushes pinch lever 120, the pinch arm 108 further rotate to compress torsion spring 119 thereby compresses pinch roller 108a against capstan shaft 121 to start the reeling of the tape.

When unloading in above condition, the mechanism moves in reverse direction on reversal of loading motor to return pinch arm, take up arm, and slant base to the original position.

The present invention as described above is an invention wherein the optimization of tape path is achieved by providing two independent cams which allows independent movement of pinch roller and take up roller thereby making each driving part move smoothly in sequence without interference from each other. The manufacturing of thinner model is achieved by arranging the 2 cams on the bottom of the main chassis, 2 levers, take up lever and cam lever above the 2 cams in the same plane and pinch arm and take up arm at the top. Particularly the stabilization of the movement of pinch arm is achieved by positioning hinge 118 of pinch arm outside of tape mounting section allowing the installation of hinge part guide higher and better rectangularity is achieved by positioning hinge part 114 of take up arm inside of cassette mouth allowing higher installation of the hinge part guide.

In addition, the above described installation of hinge part guide in a higher position has an effect of making the model thinner.

Since certain changes may be made in the above mechanism without departing from the scope of the present invention, it is intended that all matter contained in the above description and shown in the accompanying drawings shall be interpreted as illustrative and not a limiting sense.

What is claimed is:

1. A VCR deck tape loading mechanism on a main base of a VCR, comprising:
    (a) a loading motor;
    (b) pinch lever driving means for driving, responsive to a first gear, a pinch lever via a pinch roller to a loading position, said pinch lever driving means and said first gear driven by said loading motor;
    (c) take up arm driving means for driving, responsive to a second gear, a take up arm via a take up roller on a path to guide said pinch lever, said take up arm driving means moving in response to the movement of said pinch lever driving means and said second gear, said first gear engaging and rotating said second gear; and
    (d) slant base driving means for driving a slant base along a rail formed on the main base, and having a latching tip guiding said take up arm and preventing deviation of said take up arm from the path.

2. A VCR deck tape loading mechanism as claimed in claim 1, wherein said pinch lever driving means comprises
    (a) a first cam gear having a surface and a cam groove formed along a direction of rotation on the surface of said first cam gear;
    (b) a cam lever moving toward a center of rotation of said first cam gear by said first cam groove in response to rotation of said first cam gear;
    (c) said pinch lever moving toward a capstan shaft in response to said cam lever moving said pinch lever;
    (d) a pinch arm having an end rotating in a direction which is the same as a direction of rotation of said pinch lever; and
    (e) a pinch roller engaged with said capstan shaft, said pinch roller formed in the end of said pinch arm.

3. A VCR deck tape loading mechanism as claimed in claim 2, wherein said cam lever has an end connected to the main base by a hinge pin.

4. A VCR deck tape loading mechanism as claimed in claim 2, wherein said cam lever is connected to said pinch lever via a hinge pin.

5. A VCR deck tape loading mechanism as claimed in claim 2, wherein said pinch lever further comprises biasing means for biasing said pinch roller and said capstan shaft in close contact.

6. A VCR deck tape loading mechanism as claimed in claim 2, wherein said take up arm comprises
    (a) a second cam gear having a second cam groove formed along a direction of rotation on the surface of said first cam gear; and
    (b) a take up lever moving toward a center of rotation of said second cam gear by said second cam groove in response to rotation of said second cam gear, wherein said take up arm moves along a lower surface of said pinch lever in response to movement of said take up lever.

7. A VCR deck tape loading mechanism as claimed in claim 6, wherein said take up lever is connected with said take up arm through second elastic means.

8. A VCR deck tape loading mechanism as claimed in claim 6, wherein said take up arm has a locking means for locking said take up arm in a stable position when the VCR deck tape loading mechanism is in the unloaded state.

9. A VCR deck tape loading mechanism as claimed in claim 8, wherein said locking means comprises (a) a first latching tip formed on said take up arm and
(b) a pin formed on said take up lever.

10. A VCR deck tape loading mechanism as claimed in claim 1, wherein said slant base driving means comprises
    (a) a loading gear moving in response to the movement of said second cam gear;
    (b) a rotating bracket rotating in the same direction as a direction of rotation of said loading gear;
    (c) links rotated by rotation of said rotating bracket; and
    (d) said slant base moving along a rail on the main base by the rotation of said links.

11. A VCR deck tape loading mechanism as claimed in claim 10, wherein the center of rotation of said rotating bracket is the same as the center of rotation of said loading gear.

12. A VCR deck tape loading mechanism as claimed in claim 10, wherein said links comprises two bars rotatably connected with each other.

13. A VCR deck tape loading mechanism as claimed in claim 1,
    wherein said pinch lever driving means includes a cam lever, and said first and second gears are arranged on the main base of the VCR, and
    wherein said take up lever and said cam lever are arranged on a same plane and above the first and second gears.

14. A VCR deck tape loading mechanism as claimed in claim 1,
    wherein said pinch lever driving means includes a pinch roller, said take up arm driving means includes a take up roller, and said slant base driving means includes a guide roller, and
    wherein said pinch, take up and guide rollers do not overlap in movement, and said pinch, take up and guide rollers guide a tape at a same time by direct contact with the tape.

15. A VCR deck tape loading mechanism as claimed in claim 1,
    wherein said pinch lever rotates for a first angle, and said take up arm rotates for a second angle, and the second angle of the take up arm is more than twice the first angle of the pinch lever, and
    wherein said take up arm is rotated via an elastic force during beginning, middle and end of loading a tape to distribute the force of moving said take up arm.

16. A VCR deck tape loading mechanism on a main base of a VCR, comprising:
    (a) a loading motor;
    (b) pinch lever driving means for driving a pinch lever having a first center of rotation to a loading position and for driving a pinch arm having a second center of rotation, wherein said pinch lever driving means is driven by said loading motor, and said first center of rotation is the same as said second center of rotation of said pinch arm;
    (c) take up arm driving means for driving a take up arm on a path to guide said pinch lever, said take up arm driving means moving in response to the movement of said pinch lever driving means; and
    (d) slant base driving means for driving a slant base along a rail formed on the main base, and having a latching tip guiding said take up arm and preventing deviation of said take up arm from the path.

17. A VCR deck tape loading mechanism on a main base of a VCR, comprising:
    (a) a loading motor;
    (b) pinch lever driving means, driven by said loading motor, for driving a pinch lever to a loading position and for driving a pinch arm;
    (c) take up arm driving means for driving a take up arm on a path to guide said pinch lever, said take up arm driving means moving in response to the movement of said pinch lever driving means;
    (d) slant base driving means for driving a slant base along a rail formed on the main base, and having a latching tip guiding said take up arm and preventing deviation of said take up arm from the path; and
    (e) first elastic means is interposed between said pinch lever and said pinch arm, said first elastic means for biasing said pinch lever and said pinch arm together.

18. A VCR deck tape loading mechanism on a main base of a VCR, comprising:
    (a) a loading motor;
    (b) pinch lever driving means for driving a pinch lever to a loading position and for driving a pinch arm, said pinch lever driving means including a first cam gear and driven by said loading motor;
    (c) take up arm driving means for driving a take up arm on a path to guide said pinch lever, said take up arm driving means moving in response to the movement of said pinch lever driving means; and
    (d) slant base driving means for driving a slant base along a rail formed on the main base, and having a latching tip guiding said take up arm and preventing deviation of said take up arm from the path,
    wherein the center of rotation of said take up arm is the same with the center of rotation of said first cam gear.

* * * * *